No. 869,612.

PATENTED OCT. 29, 1907.

R. E. ATKINSON.
REGULATOR.
APPLICATION FILED OCT. 26, 1905.

2 SHEETS—SHEET 1.

WITNESSES
W. P. Burke

INVENTOR
Robert Ernest Atkinson
BY Richardson
ATTYS

No. 869,612.

PATENTED OCT. 29, 1907.

R. E. ATKINSON.
REGULATOR.
APPLICATION FILED OCT. 26, 1905.

2 SHEETS—SHEET 2.

WITNESSES
W. P. Bent
W. Petit

INVENTOR
Robert Ernest Atkinson
By Richard S. ATTYS

UNITED STATES PATENT OFFICE.

ROBERT ERNEST ATKINSON, OF LEICESTER, ENGLAND.

REGULATOR.

No. 869,612.  Specification of Letters Patent.  Patented Oct. 29, 1907.

Application filed October 26, 1905. Serial No. 284,546.

*To all whom it may concern:*

Be it known that I, ROBERT ERNEST ATKINSON, a subject of the King of Great Britain and Ireland, and residing at 57 Evington road, in the county of Leicester, England, have invented certain new and useful Improvements in Regulators, of which the following is a specification.

This invention relates to regulators employed on radiators and like heating apparatus, the object being to provide means whereby the supply of steam to the various radiators or like apparatus in a room may be automatically controlled by the temperature of the room, that is to say, the arrangement is to be such that as the temperature of the room falls below a certain pre-determined degree, more steam is admitted to the radiator therein, whereas when the temperature of the room rises above a certain degree, the supply of steam to the radiator is more or less decreased.

The invention while being applicable to steam heating systems generally, is especially applicable to steam heating systems wherein a vacuum or low pressure is maintained in the return mains.

According to the invention the supply of steam to each of the various radiators in a system is automatically controlled firstly, by a thermostatic valve influenced by the prevailing heat in or close to the radiator, and secondly, by a diaphragm valve, the differential pressure on the diaphragm of which is controlled by a thermostat influenced by the prevailing heat of the room or any part of the room wherein the thermostat is placed. The differential pressure on the diaphragm may be effected by the atmosphere on the one side and either by compressed air or by partial vacuum such as prevails in the return mains of a vacuum system on the other side.

The accompanying drawings illustrate several modes of carrying the invention into effect as applied to a vacuum steam heating system.

Figure 1:
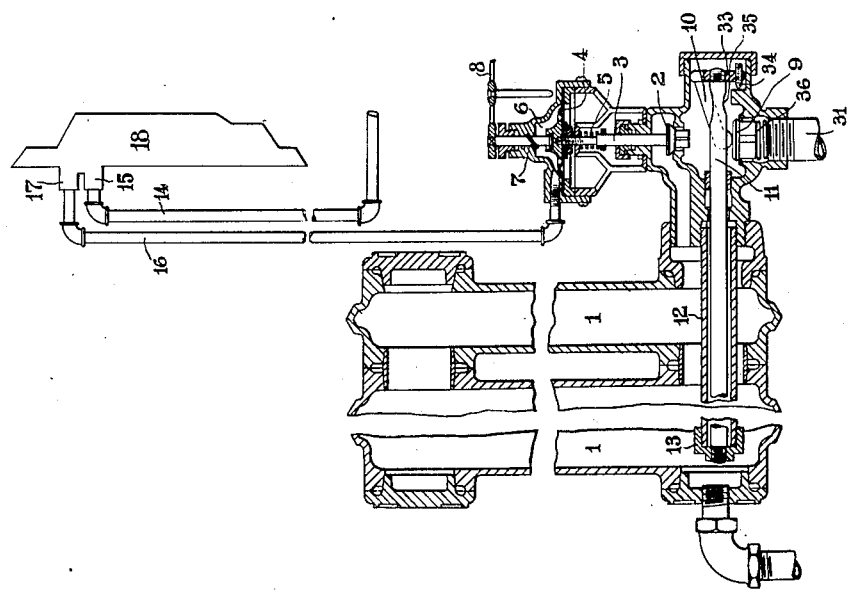
Figure 3:
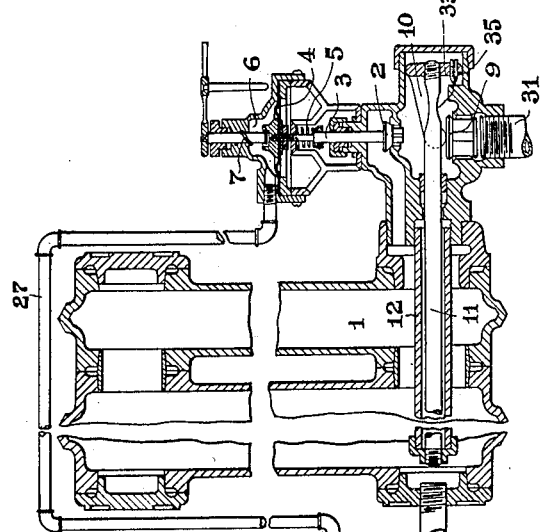
Figure 2:
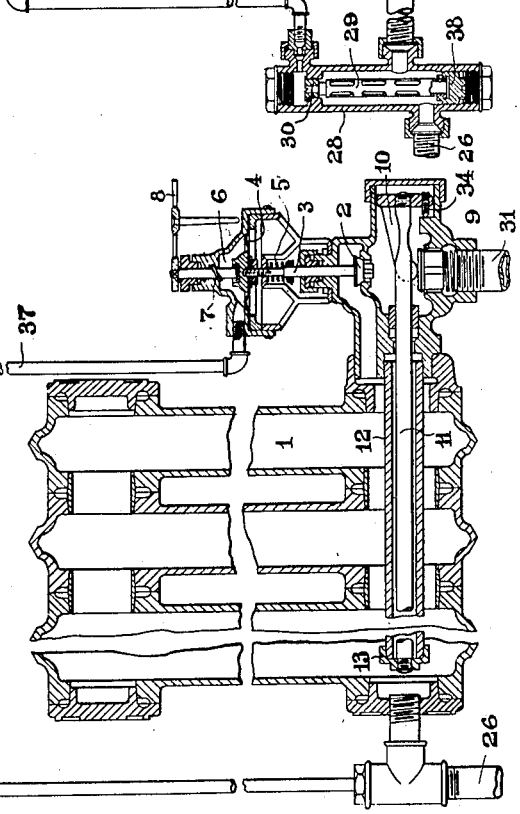

Figure 1 is a sectional elevation of part of a radiator with the invention applied according to one mode wherein compressed air is used to actuate the diaphragm valve. Fig. 2 is a sectional elevation of a radiator with the invention applied according to a mode wherein the diaphragm valve is operated by the low pressure existing in the return main, and wherein a thermostat is used. Fig. 3 is a sectional elevation of a radiator with the invention applied according to another mode wherein the diaphragm valve is operated by the low pressure existing in the return main.

In carrying out the invention according to one mode as illustrated in Fig. 1, the radiator 1, is fitted with a compound valve or automatic regulator comprising a valve 2, carried upon a spindle 3, attached to a diaphragm 5, and influenced by compressed air as hereinafter described, and also a valve 9, controlled by a thermostatic device situated within the radiator. The steam admitted by the pipe 31, and passing the valve 9, then has to pass the valve 2, before it can enter the radiator. The supply of steam therefore to the radiator is controlled primarily by the heat prevailing in or near the radiator and secondly by means of the valve 2 which is under the influence of compressed air controlled by a thermostat situated in any convenient part of the room so that the temperature in that part of the room controls the inlet of steam to the radiator. The valve 2, is normally held to its seat by a spring 5, surrounding the valve spindle 3, and abutting at one end against a part of the casing and at the other against a collar on the spindle 3. As before stated, the spindle is attached to a diaphragm 4. The diaphragm is open to the pressure of the atmosphere on its under side, while its upper side is under the influence of the pressure existing in the chamber 6. Thus according to the variations of pressure in this chamber so will the valve 2, be moved to or away from its seat. It may in case of emergency be positively forced to its seat by a screwed spindle 7, having a quick-thread, and operated by a handle 8, which may be fitted with a pointer to indicate whether the valve is in its normal condition or closed down. The chamber 6, above the diaphragm is connected by a pipe 16, to a connection 17, on a thermostat 18. A supply of compressed air from any convenient source is led by a pipe 14 to a connection 15, on the thermostat 18. The thermostat may be of any usual type.

Any suitable form of thermostatic valve influenced by the heat in or near the radiator may be used, for instance, that shown in Fig. 1, may be employed which has already been described in my Patent No. 829,691. This comprises a valve 9, held to its seat by two fingers 10, carried by a disk 33, pivoted on a pin 34, and attached to an iron rod 11, which is thinned at 35, to render it somewhat elastic, and is attached by a cap 13, to a copper tube 12, which is secured at its opposite end to the valve casing. Thus, the heat prevailing in the lower part of the radiator will cause the rod 11, and tube 12, to expand, but owing to the different co-efficients of expansion of iron and copper, the valve 9, on a rise of temperature will be brought to its seat and on a fall of temperature will be permitted to open under the influence of the steam entering by the pipe 31, and of the spring 36. Thus, the valve 9, will be controlled by the heat in or close to the radiator, while the valve 2 will be controlled by the heat in that part of the room wherein the thermostat 18, is situated. It is obvious that the valve 9, may be so set or regulated as not to be entirely closed under a temperature which would affect the closing of the valve 2, so that the heat of the apartment or room may be automatically controlled to suit any desired requirements.

In carrying out the invention according to another mode, a combined regulator of the same form as that above described may be employed, but the upper side of the diaphragm 4, may be placed under the influence of the low pressure prevailing in the return pipe or main 26, as shown in Fig. 2, wherein the chamber 6, of the diaphragm valve is shown connected by a pipe 37, with a connection 17, on a thermostat 18, while the return pipe 26, is connected by a pipe 25, with a connection 15, on the thermostat. It is to be understood that this thermostat does not in itself form part of the present invention but that any suitable form may be employed.

The operation of the arrangement illustrated in Fig. 2 is very similar to that of the arrangement shown in Fig. 1, the valve 9, being opened or closed according to a fall or rise in temperature in or close to the radiator and the valve 2, being opened or closed according to a fall or rise of temperature in that part of the room in which the thermostat 18, is situated, the valve 2, in this case, however, being operated by the difference in pressure existing between the atmosphere on the under-side of the diaphragm 4, and the pressure in the chamber 6, which when the valve is to be opened is the low pressure existing in the return pipe 26.

In carrying out the invention according to the mode illustrated by Fig. 3, the thermostat 18. of the previous examples is dispensed with and a simple thermostatic valve 28, of well-known form (such as sometimes used as an air-vent) is interposed between the return pipe 26, and a pipe 27, leading to the chamber 6, of the diaphragm valve. The thermostatic valve 28, comprises a cylinder 29, of a material which has a high co-efficient of expansion the cylinder being adapted to abut against a plug 38, at one end and a seat 30, at the other end. Thus, when the temperature in the valve 28, falls sufficiently, the cylinder 29, will contract and open communication between the return pipe 26, and the chamber 6, so that the diaphragm 4, under the greater pressure of the atmosphere on its under-side will rise and open the valve 2, the converse operation occurring when the temperature in the valve 28, rises sufficiently to cause the cylinder 29, to close against its seat 30.

Having thus described my invention, what I claim as new and desire to secure by Letters Patent is:—

1. The combination with a heating apparatus of a thermostatically actuated valve adapted to control the supply of a heating medium thereto according to the temperature of said heating apparatus, and additional thermostatically actuated means adapted to control said supply according to the temperature remote from said heating apparatus.

2. The combination with a heating apparatus of a thermostatically actuated valve adapted to control the supply of a heating medium thereto according to the temperature of said heating apparatus and an additional valve adapted to control said supply according to the temperature remote from said heating apparatus, a spindle for carrying said additional valve, a flexible diaphragm connected to said spindle, a chamber against which the diaphragm is mounted, said diaphragm having one side open to atmospheric pressure and the other side influenced by the pressure in said chamber, a connection from the latter to the exhaust side of the apparatus, and a thermostat for controlling said connection.

3. The combination with a heating apparatus of a combined regulator comprising a primary steam supply valve 9, thermostatic members 11, 12 for controlling said valve, a second valve 2 for controlling the steam supplied by the first valve, a diaphragm 4 for controlling said valve 2, and a chamber 6 to which said diaphragm is connected, a connection between said chamber and the exhaust side of the apparatus, and a thermostat controlling said connection, substantially as and for the purpose hereinbefore set forth.

In testimony whereof I have signed my name to this specification in the presence of two subscribing witnesses.

ROBERT ERNEST ATKINSON.

Witnesses:
ALBERT E. PARKER,
BERTRAM H. MATTHEWS.